United States Patent
So et al.

(10) Patent No.: US 11,244,307 B2
(45) Date of Patent: Feb. 8, 2022

(54) TRANSACTION PROCESSING SYSTEM AND METHOD ENABLING EXPANSION OF BLOCKCHAIN

(71) Applicant: LINE Plus Corporation, Seongnam-si (KR)

(72) Inventors: Hongsup So, Seongnam-si (KR); Hong Kyu Lee, Seongnam-si (KR); Jeehong Lee, Seongnam-si (KR); Chul-soon Choi, Seongnam-si (KR); Eunho Chang, Seongnam-si (KR); Hojin Jang, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 155 days.

(21) Appl. No.: 16/673,359

(22) Filed: Nov. 4, 2019

(65) Prior Publication Data

US 2020/0210998 A1    Jul. 2, 2020

(30) Foreign Application Priority Data

Jan. 2, 2019    (KR) ........................ 10-2019-0000269

(51) Int. Cl.
  *G06Q 20/36*    (2012.01)
  *G06Q 20/06*    (2012.01)
  *H04L 9/06*    (2006.01)

(52) U.S. Cl.
  CPC ..... *G06Q 20/3676* (2013.01); *G06Q 20/0658* (2013.01); *G06Q 20/3674* (2013.01); *H04L 9/0637* (2013.01)

(58) Field of Classification Search
  CPC .......... G06Q 20/3676; G06Q 20/3674; G06Q 20/658; G06Q 20/02; G06Q 20/065;
  (Continued)

(56) References Cited

U.S. PATENT DOCUMENTS 10,102,265 B1 * 10/2018 Madisetti ................ G06Q 20/06
11,030,217 B2 * 6/2021 Vo ........................... G06F 16/27
(Continued)

FOREIGN PATENT DOCUMENTS

AU    2020202793 A1 *    5/2020
JP    2017-54339 A    3/2017
(Continued)

OTHER PUBLICATIONS

Eyal et al., "Bitcoin-NG: A Scalable Blockchain Protocol", Nov. 11, 2015, 21 pages (Year: 2015).*

(Continued)

*Primary Examiner* — James D Nigh
(74) *Attorney, Agent, or Firm* — Sughrue Mion, PLLC

(57) ABSTRACT

A transaction processing system may include: a plurality of leaf chains including a first leaf chain and a second leaf chain, the first leaf chain and the second leaf chain including a first leaf chain manager contract and a second leaf chain manager contract, respectively; a root chain comprising a root chain manager contract for the root chain, a first leaf chain contract for the first leaf chain, and a second leaf chain contract for the second leaf chain; and at least one relayer located between the root chain and the plurality of leaf chains, and configured to process a remittance request from the first leaf chain to the second leaf chain.

20 Claims, 10 Drawing Sheets

(58) Field of Classification Search
CPC .............. G06Q 20/223; G06Q 20/3678; G06Q 20/3827; G06Q 20/3829; G06Q 20/389; G06Q 20/382; G06Q 20/36; G06Q 20/108; G06Q 2220/00; H04L 9/0637; H04L 9/3239; H04L 2209/38
USPC .......................................................... 705/68
See application file for complete search history.

(56) References Cited

U.S. PATENT DOCUMENTS

| | | | |
|---|---|---|---|
| 2019/0058709 A1* | 2/2019 | Kempf | H04L 9/3226 |
| 2019/0123890 A1* | 4/2019 | Scott | H04L 9/0643 |
| 2021/0273807 A1* | 9/2021 | Wertheim | H04L 9/3221 |

FOREIGN PATENT DOCUMENTS

| | | | | |
|---|---|---|---|---|
| KR | 10-2013-0087440 A | | 8/2013 | |
| KR | 10-2018-0089187 A | | 8/2018 | |
| KR | 10-2018-0113143 A | | 10/2018 | |
| WO | WO-2019021105 A1 * | | 1/2019 | ........... H04L 9/3297 |
| WO | WO-2020022957 A1 * | | 1/2020 | ............. H04L 63/12 |

OTHER PUBLICATIONS

Beyer, "Blockchain Interoperability—Moving Assets Across Chains", retrieved from https://medium.com/cryptronics/blockchain-interoperability-moving-assets-across-chains-e5203357d949, 17 pages, Nov. 2018 (Year: 2018).*
Rosie, "Blockchain Scalability: When, Where, How?", retrieved from https://blockgeeks.com/guides/blockchain-scalability/, 46 pages, May 4, 2020 (Year: 2020).*
Trevethan et al., "Mainstay: enabling trustless immutability in federated sidechains", CommerceBlock, 13 pages, Jul. 30, 2018 (Year: 2018).*
"ICON Hyperconnect the World", Icon Foundation, 39 pages, Aug. 15, 2017 (Year: 2017).*
Frankenfield, Sharding Definition, Investopedia, 11 pages, Mar. 7, 2021 (Year: 2021).*
Hong Kyu Lee, Published document (https://www.slideshare.net/deview/132-119078831), Oct. 11, 2018.
Office Action dated May 20, 2020 in Korean Application No. 10-2019-0000269.
ICON Foundation whitepaper, Version 1.0, Jan. 31, 2018 (49 pages total).

* cited by examiner

TRANSACTION PROCESSING SYSTEM AND METHOD ENABLING EXPANSION OF BLOCKCHAIN

CROSS-REFERENCE TO RELATED APPLICATION(S)

This application claims priority from Korean Patent Application No. 10-2019-0000269, filed on Jan. 2, 2019 in the Korean Intellectual Property Office (KIPO), the disclosure of which is incorporated herein by reference in its entirety.

BACKGROUND

Field

Apparatuses and methods consistent with example embodiments relate to a transaction processing system and method that enables expansion of a blockchain.

Description of Related Art

A blockchain refers to an electronic ledger that records a list of transactions between source identifiers and destination identifiers, and is configured as a computer-based distributive peer-to-peer (P2P) system including blocks/nodes for transactions. Each transaction is in a data structure that stores encoded transmissions of digital asset between participating entities in a blockchain computer system. The transactions may be bundled into blocks to form a blockchain, and each block except for the first block may include a hash value of a previous block and generates permanent and unalterable records of all of the transactions recorded in the blockchain from beginning to end through connections to corresponding blocks.

SUMMARY

One or more example embodiments provide a transaction processing system and method that may scale out by adding a leaf chain based on a root chain.

According to an aspect of at least one example embodiment, there is provided a transaction processing system including: a plurality of leaf chains comprising a first leaf chain and a second leaf chain, the first leaf chain and the second leaf chain comprising a first leaf chain manager contract and a second leaf chain manager contract, respectively; a root chain comprising a root chain manager contract for the root chain, a first leaf chain contract for the first leaf chain, and a second leaf chain contract for the second leaf chain; and at least one relayer located between the root chain and the plurality of leaf chains, and configured to process a remittance request from the first leaf chain to the second leaf chain through relay between the first leaf chain manager contract included in the first leaf chain and the first leaf chain contract included in the root chain and between the second leaf chain contract included in the root chain and a second leaf chain manager contract included in the second leaf chain.

The relayer may include: a producer module configured to collect a transaction generated in each of the plurality of leaf chains or an allocated leaf chain, and collect a transaction generated in the root chain; and an interchain consumer module configured to transfer a first remittance request from the first leaf chain manager contract in the first leaf chain to a first leaf chain contract in the root chain, or to transfer a second remittance request from the second leaf chain contract in the root chain to the second leaf chain manager contract in the second leaf chain.

The relayer may further include: a queue server configured to store the transaction collected by the producer module in a queue and to sequentially provide the stored transaction to the interchain consumer module; and an interchange failover module configured to switch from a first computer system to a second computer system to process the remittance request using the second computer system, in response to a failure of the first computer system being detected while the remittance request is processed by the first computer system.

The root chain manager contract may be configured to: determine whether the remittance request is normal by analyzing a total coin amount issued from each of the plurality of leaf chains based on remittance request information, and record the remittance request determined to be normal in a transaction block.

The root chain manager contract may be configured to: process a remittance complete request through the relay from each of the plurality of leaf chains using a remittance request record of the remittance request, delete the remittance request record when the remittance complete request has been processed, and request a corresponding leaf chain to complete a remittance through the relayer.

The root chain manager contract may be configured to: register an address of a leaf chain contract of a new leaf chain installed in the root chain in response to addition of the new leaf chain, and add a relayer user accessible to the first leaf chain contract and the second leaf chain contract in the root chain.

The first leaf chain manager contract may be configured to register an address of a service contract for a new service installed in the first leaf chain, and the root chain manager contract is configured to further register the address of the service contract.

The first leaf chain manager contract may be configured to receive a remittance request from a first user through a first service contract installed for a first service of the first leaf chain, record the received remittance request in a transaction block of the first leaf chain, and transfer the received remittance request to the root chain through the relayer, and adjust a total currency amount of the first leaf chain in response to a remittance complete request being transferred from the root chain through the relayer.

The first leaf chain manager contract may be configured to generate an exchange transaction hash in response to the remittance request, and generate a remittance request record including the exchange transaction hash, an identifier of the first service, an identifier of a second service that is a subject of the remittance request, an identifier of a second user of the second service, and a unique value, wherein the unique value is generated based on a request time of the remittance request, the identifier of the first leaf chain corresponding to the remittance request, and an identifier of the transaction block.

The first leaf chain manager contract may be configured to subtract an amount requested to be remitted from a balance of the first user in response to receiving the remittance request from the first user and to lock the subtracted amount not to be used.

The first leaf chain manager contract may be configured to unlock the locked amount and return the amount to the first user in response to a failure of the remittance request.

The at least one relayer may include relayers respectively corresponding to the plurality of leaf chains and a relayer corresponding to the root chain.

In the relayers respectively corresponding to the plurality of leaf chains, a corresponding leaf chain may dynamically change at preset time intervals.

According to an aspect of another example embodiment, there is provided a transaction processing method of a relayer comprising one or more processors, the transaction processing method including: receiving, from a first leaf chain manager contract included in a first leaf chain, a first remittance request from a first service of the first leaf chain to a second service of a second leaf chain; causing the received first remittance request to be transmitted to a first leaf chain contract of the first leaf chain included in a root chain; receiving a second remittance request corresponding to the first remittance request, from a second leaf chain contract of the second leaf chain included in the root chain; and causing the received second remittance request to be transmitted to a second leaf chain manager contract included in the second leaf chain.

The transaction processing method may further include: receiving a first remittance complete request corresponding to the second remittance request from the second leaf chain manager contract; causing the received first remittance complete request to be transmitted to the second leaf chain manager contract included in the root chain; receiving a second remittance complete request corresponding to the first remittance complete request from the first leaf chain contract in the root chain; and causing the received second remittance complete request to the first leaf chain manager contract included in the first leaf chain.

The first remittance request may include a remittance request from a first user of the first service to a second user of the second service, and a coin according to the remittance request is configured to be subtracted from a balance of the first user, to be locked not to be used, and to be stored as a remittance request record in an escrow contract through the first leaf chain manager contract of the first leaf chain.

The receiving of the first remittance request or the receiving of the second remittance request may be performed by collecting a transaction through a producer module included in the relayer, and the invoking of the first remittance request or the invoking of the second remittance request may be performed through an interchain consumer module further included in the relayer.

A root chain manager contract included in the root chain may be configured to determine whether the first remittance request is normal by analyzing a total coin amount issued from each of a plurality of leaf chains based on remittance request information, record the first remittance request determined to be normal in a transaction block, and transmit the second remittance request corresponding to the first remittance request to the relayer through the second leaf chain contract.

According to an aspect of another example embodiment, there is provided a non-transitory computer-readable record medium storing a computer program that when executed by a processor, causes the one or more processors to perform the transaction processing method.

According to an aspect of another example embodiment, there is provided a relayer for processing a transaction between a first leaf chain and a second leaf chain, with interaction with a root chain, the relayer including one or more processors configured to: receive, from a first leaf chain manager contract module included in the first leaf chain, a first remittance request that requests a remittance from the first leaf chain to the second leaf chain; cause the received first remittance request to be transmitted to a first leaf chain contract module included in the root chain; receive a second remittance request corresponding to the first remittance request, from a second leaf chain contract module included in the root chain; and cause the received second remittance request to be transmitted to a second leaf chain manager contract module included in the second leaf chain.

Further areas of applicability will become apparent from the description provided herein. The description and specific examples in this summary are intended for purposes of illustration only and are not intended to limit the scope of the present disclosure.

BRIEF DESCRIPTION OF THE FIGURES

The above and/or other aspects will be more apparent by describing certain example embodiments, with reference to the accompanying drawings, in which.

Figure 1:
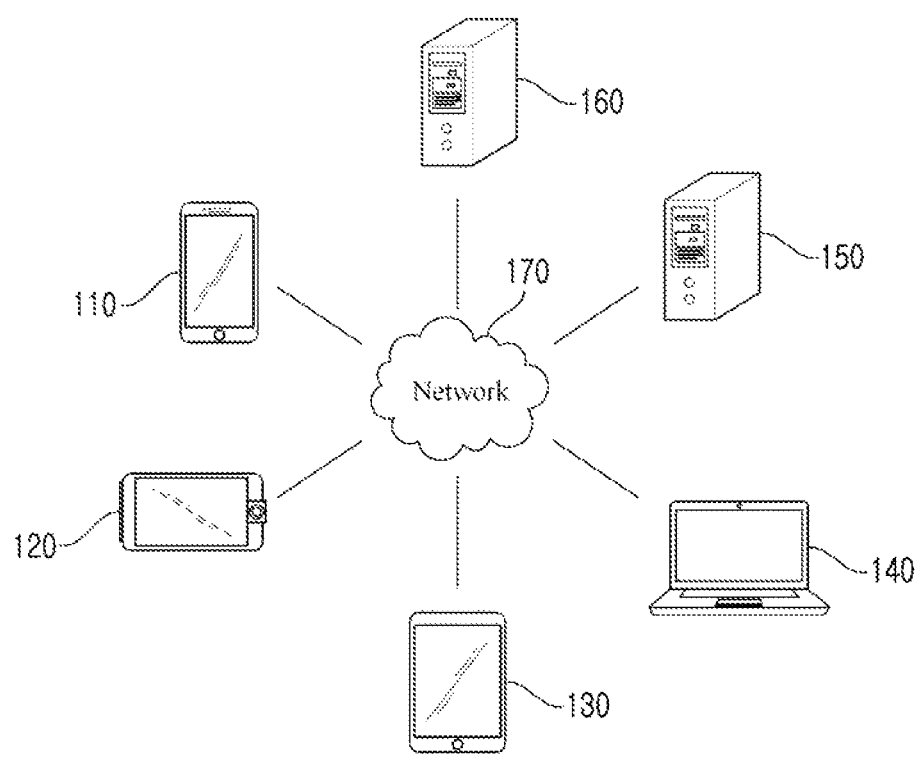
FIG. 1 illustrates an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

A transaction processing system according to example embodiments may be implemented by at least one computer apparatus. Here, a computer program according to example embodiments may be installed and executed on the computer apparatus. The computer apparatus may perform a transaction processing method according to the example embodiments under control of the executed computer program. The computer program may be stored in a non-transitory computer-readable record medium to perform the transaction processing method on the computer apparatus in conjunction with the computer apparatus. Here, the aforementioned computer program may be in a form of a single independent program package or may be in a form in which a single independent program package is installed in advance in the computer apparatus and interacts with an operating system (OS) or other program packages.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, a number of electronic devices and/or a number of servers are not limited thereto. The network environment of FIG. 1 describes an example of environments applicable to the example embodiments and an environment applicable to the example embodiments is not limited to the network environment of FIG. 1.

Each of the plurality of electronic devices 110, 120, 130, and 140 may be a stationary terminal or a mobile terminal configured as a computer apparatus. For example, the plurality of electronic devices 110, 120, 130, and 140 may be a smartphone, a mobile phone, a navigation, a computer, a laptop computer, a digital broadcasting terminal, a personal digital assistant (PDA), a portable multimedia player (PMP), and a tablet personal computer (PC). For example, although FIG. 1 illustrates a shape of a smartphone as an example of the electronic device 110, the electronic device 110 may refer to one of various physical computer apparatuses capable of communicating with other electronic devices 120, 130, and 140, and/or the servers 150 and 160 over the network 170 in a wired communication manner or in a wireless communication manner.

The communication scheme is not particularly limited and may include a communication method using a near field communication between devices as well as a communication method using a communication network, for example, a mobile communication network, the wired Internet, the wireless Internet, a broadcasting network, etc., which may be included in the network 170. For example, the network 170 may include at least one of network topologies that include, for example, a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that store and execute instructions, codes, files, contents, services, and the like through communication with the plurality of electronic devices 110, 120, 130, and 140 over the network 170. For example, the server 150 may be a system that provides a service, for example, a video call service, a financial service, a payment service, a social networking service (SNS), a messaging service, a search service, a mail service, and a content providing service, and/or a question-and-answer service, to the plurality of electronic devices 110, 120, 130, and/or 140 over the network 170.

Figure 2:
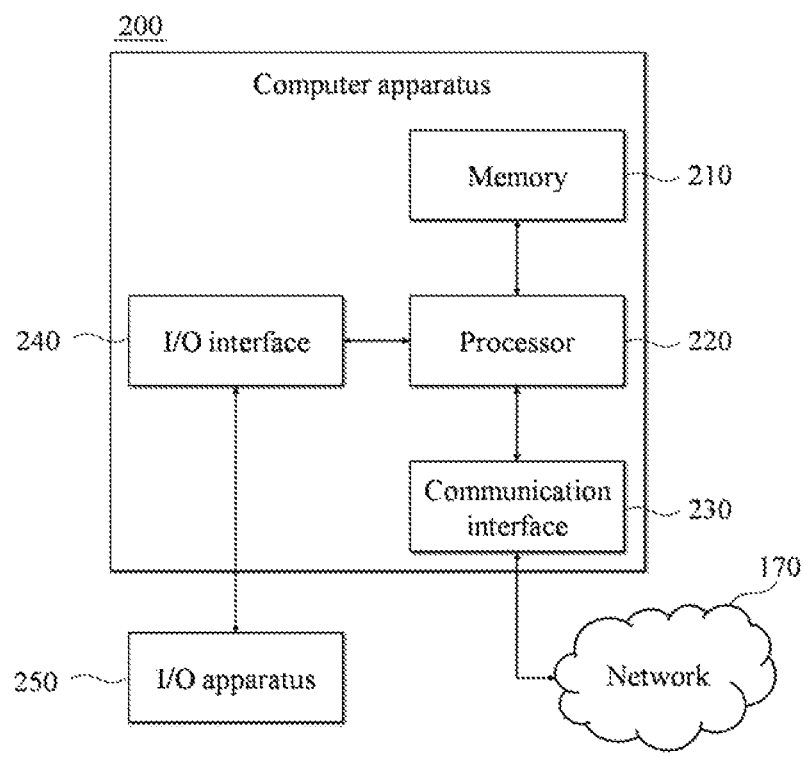
FIG. 2 illustrates an example of a computer apparatus according to at least one example embodiment.

FIG. 2 is a block diagram illustrating an example of a computer apparatus according to at least one example embodiment. Each of the plurality of electronic devices 110, 120, 130, and 140 or each of the servers 150 and 160 may be configured through a computer apparatus 200 of FIG. 2. A method according to example embodiments may be performed by the computer apparatus 200.

Referring to FIG. 2, the computer apparatus 200 may include a memory 210, a processor 220, a communication interface 230, and an input/output (I/O) interface 240. The memory 210 may include a permanent mass storage device, such as random access memory (RAM) and read only memory (ROM), as a non-transitory computer-readable storage medium. Here, the permanent mass storage device, such as ROM and a disk drive, may be included in the computer apparatus 200 as a permanent storage device separate from the memory 210. Also, an OS or at least one program code may be stored in the memory 210. Such software components may be loaded to the memory 210 from another non-transitory computer-readable storage medium separate from the memory 210. The other non-transitory computer-readable storage medium may include a non-transitory computer-readable record medium, for example, a floppy drive, a disk, a tape, a DVD/CD-ROM drive, a memory card, etc. According to other example embodiments, the computer apparatus 200 may download software components from the network 170 through the communication interface 230, and may store the software components on the memory 210, instead of, or in addition to, the non-transitory computer-readable storage medium. For example, software components may be loaded to the memory 210 of the computer apparatus 200 based on a computer program installed by files provided over the network 170.

The processor 210 may be configured to process computer-readable instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the computer apparatus 200 and another apparatus, for example, the aforementioned storage device, over the network 170. For example, the processor 220 may control the communication interface 230 to transfer a request or an instruction, created based on a program code stored in the storage device such as the memory 210, to other devices over the network 170. Also, the processor 220 may control the communication interface 230 to receive a signal and/or an instruction from another apparatus that is connected to the network 170. Upon receipt, the communication interface 230 may transfer a signal, an instruction, a file, data, and/or content, to the processor 220 or the memory 210. The processor 220 may control to store the signal, instruction, file, data, and/or content in a storage medium, for example, the aforementioned permanent storage device, further includable in the computer apparatus 200.

The I/O interface 240 may be a device used for interface with an I/O apparatus 250. The I/O apparatus 250 may include an input device and/or an output device. Examples of the input device may include a keyboard, a camera, a microphone, and a mouse, and examples of the output device may include a display and a speaker. The I/O interface 240 may be implemented as a device driver software (e.g., a keyboard driver software, a camera driver software, etc.) that is stored in the memory 210 and executed by the processor 220 to control the I/O apparatus 250. As another example, the I/O interface 240 may be a device for interface with an apparatus in which an input function and an output function are integrated into a single function, such as a touchscreen. The I/O apparatus 250 may be integrated into the computer apparatus 200.

According to other example embodiments, the computer apparatus 200 may include a greater or less number of components than a number of components shown in FIG. 2. However, there is no need to clearly illustrate many components according to the related art. For example, the computer apparatus 200 may include at least a portion of the I/O apparatus 250, or may further include other components, for example, a transceiver, a database (DB), and the like.

Figure 3:
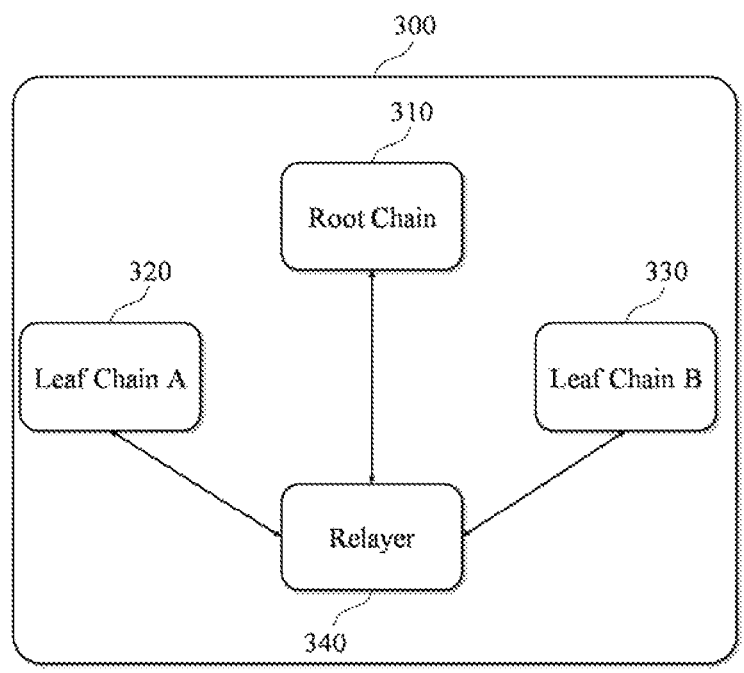
FIG. 3 illustrates an example of a configuration of a transaction processing system enabling expansion of a blockchain according to at least one example embodiment.

FIG. 3 illustrates an example of a configuration of a transaction processing system enabling expansion of a blockchain. FIG. 3 illustrates an example of a transaction processing system 300 that includes a root chain 310, a leaf chain A 320, a leaf chain B 330, and a relayer 340. The root chain 310 and the leaf chains 320 and 330 may form a network in which a plurality of computer apparatuses is connected and the relayer 340 may be configured using at least one computer apparatus. In the present disclosure, the root chain may be also referred to as a root chain computer system or a root chain network including one or more processors and one or more storages. Similarly, the leaf chain may be also referred to as a leaf chain computer system or a leaf chain network including one or more processors and one or more storages. The relayer 340 may be referred to as a computer system including a relay function, a relay device, a relay module, or a relay network including one or more processors and one or more storages.

In the transaction processing system 300, the root chain 310 may be regarded as an absolute trusted system, and each of the leaf chains 320 and 330 needs to verify that a corresponding leaf chain is a trusted system. Here, each of the leaf chains 320 and 330 may be linked to an individual service and a new leaf chain may be added in response to addition of a new service. That is, although FIG. 3 illustrates two leaf chains 320 and 330, at least three leaf chains may be provided. That is, a blockchain is expandable. Here, the term "service" may include an online service provided from the same entity or different entities to users thereof through a network. For example, a leaf chain corresponding to each of Internet banking services provided from different banks may be constructed. Alternatively, a leaf chain corresponding to each of different social network services may be constructed. Each of the leaf chains 320 and 330 needs to be trusted by recording a hash value of a block in the root chain 310. For example, a Merkle tree root hash, Tiger tree hash, and the like may be used.

In the root chain 310, a coin exchange between users may not occur. The coin exchange may be processed in each of the leaf chains 320 and 330 and/or between the leaf chains 320 and 330. Here, the coin exchange between the leaf chains 320 and 330 may be intermediated and managed by the root chain 310 through the relayer 340. At least one decentralized application (dApp) may be included in each of the leaf chains 320 and 330. Here, the decentralized application refers to an application in which a decentralized backend code runs on a decentralized peer-to-peer (P2P) network (or data call and registration is performed in a blockchain database) and it is provided from a frontend through an interface. Here, a smart contract that is irrelevant to a chain and coin exchange may be installed in each of the leaf chains 320 and 330 depending on whether a decentralized application is required. Here, the root chain 310 may not involve. If each of the leaf chains 320 and 330 may be configured to install a smart contract having a protocol for a coin exchange between chains, a permission for installing the smart contract needs to be received from the root chain 310. The coin exchange between chains using the smart contract may not be allowed if the smart contract is not authorized or approved by the root chain 310.

The coin exchange inside each of the leaf chains 320 and 330 may be processed in each of the corresponding leaf chains 320 and 330 without passing through the root chain 310 and referring to abstract information, for example, the aforementioned Merkle tree root hash, of all of the blocks including processing content may be recorded in the root chain 310. On the contrary, the coin exchange between the leaf chains 320 and 330 may need to be processed through the root chain 310. Processing content about the coin exchange may need to be recorded in a block of each of the leaf chains 320 and 330 and a block of the root chain 310. Here, the coin exchange between the leaf chains 320 and 330 may be processed through the relayer 340.

Figure 4:
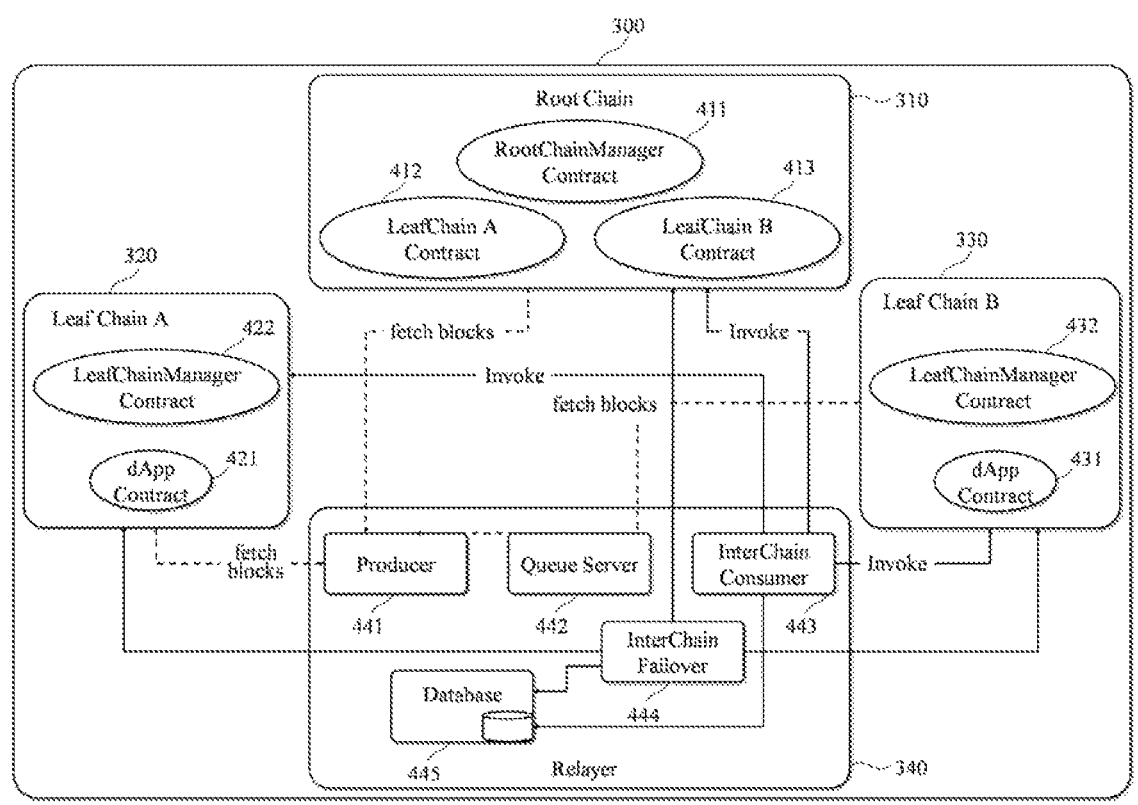
FIG. 4 illustrates an example of a configuration of a transaction processing system according to at least one example embodiment.

FIG. 4 illustrates an example of a configuration of a transaction processing system according to at least one example embodiment. Referring to FIG. 4, the transaction processing system 300 may include a single root chain 310, a plurality of leaf chains 320 and 330, and the relayer 340.

The root chain 310 may include a smart contract for the root chain 310, that is, a root chain manager contract (RootChainManager Contract) 411, and may include a smart contract for each of the plurality of leaf chains 320 and 330 included in the transaction processing system 300. The root chain manager contract 411 may refer to a hardware module or a software module including a smart contract for each of the plurality of leaf chains 320 and 330. For example, in FIG. 4, the root chain 310 includes a smart contract for the leaf chain A 320, that is, a leaf chain A contract (LeafChain A Contract) 412 and a smart contract for the leaf chain B 330, that is, a leaf chain B contract (LeafChain B Contract) 413. The leaf chain A contract 412 and leaf chain B contract 413 may refer to hardware modules or software modules including smart contracts for the leaf chain A and the leaf chain B, respectively. The smart contract may be a computer protocol that digitally facilitates, verifies, or enforces the negotiation or performance of a contract. The smart contract may be written as code that defines conditions, rules, and penalties around an agreement, and when an event outlined the contract is triggered, the code may be executed by itself.

Also, each of the leaf chains 320 and 330 may include a smart contract for a decentralized application (dApp). In the example embodiment of FIG. 4, for example, the leaf chain A 320 includes a dApp contract 421 and the leaf chain B 330 includes a dApp contract 431. Also, the leaf chain A 320 may further include a smart contract for the leaf chain A 320, that is, a leaf chain manager contract (LeafChainManager Contract) 422, and the leaf chain A 330 may further include a smart contract for the leaf chain B 330, that is, a leaf chain manager contract (LeafChainManager Contract) 432.

The relayer 340 may invoke information that is required to be recorded and/or transferred in the root chain 310 and the leaf chains 320 and 330 while observing a block generation in the root chain 310 and the leaf chains 320 and 330. The relayer 340 may include a producer 441, a queue server 442, an interchain consumer 443, an interchain failover 444, and a database 445. The producer 441, the interchain consumer 443, and the interchain failover 444 may be implemented as hardware modules, software modules, and a combination of hardware modules and software modules.

The producer 441 may collect information of all of blocks that are newly generated in chains including the root chain 310 and may input the collected information to the queue server 442. The queue server 442 may store and sequentially provide the collected information, and may use a distributed stream-processing software platform, such as Kafka, to publish and subscribe to streams of records, store streams of records, and process streams of records as they occur. Here, the interchain consumer 443 may filter an event that needs to be invoked for each chain. A plurality of filtering operations may be required depending on an event. In the case of invoke for each chain, the interchain consumer 443 may generate a separate user for each chain for signification and may record a right of the user in a smart contract.

The interchain consumer 443 may detect the following events (1) to (7):
 (1) Remittance request event in a leaf chain;
 (2) Remittance request event in a root chain;
 (3) Remittance request failure event in a root chain;
 (4) Remittance complete event in a leaf chain;
 (5) Remittance complete event in a root chain;
 (6) Coin issuance event in a root chain; and
 (7) Block generation event in a leaf chain.

The interchain consumer 443 may detect the remittance request event (i.e., event (1)) in the leaf chain and may transfer remittance request content to a root chain.

The interchain consumer 443 may detect the remittance request event (i.e., event (2)) in a root chain and may transfer remittance request content to a leaf chain that is to receive a corresponding remittance request.

In response to a failure in transferring the remittance request to the leaf chain, the interchain consumer 443 may transfer, to the root chain, remittance failure information including identification information of the leaf chain that is to receive the remittance request.

The interchain consumer 443 may transfer remittance failure content to a leaf chain having requested a remittance, in operation (3-1).

The interchain consumer 443 may transfer remittance complete content to a root chain, in operation (4-1).

The interchain consumer 443 may transfer remittance complete content to a leaf chain having requested a remittance, in operation (5-1).

The interchain consumer 443 may transfer issuance content to a leaf chain from which a coin is issued, in operation (6-1).

The interchain consumer 443 may transfer a Merkle tree root hash of a block to a root chain, in operation (7-1).

The interchain failover 444 may provide a failover function such that operations (3-1), (4-1), (5-1), (6-1), and (7-1) may be normally performed, and the database 445 may be used to store information received and/or transmitted (transferred) in the interchain consumer 443 and the interchain failover 444. The interchange failover 444 may switch from a first computer system/module to a second computer system/module to process the remittance request in response to a failure of the first computer system/module being detected while operations (3-1), (4-1), (5-1), (6-1), and (7-1) are performed on the first computer system/module.

Figure 5:
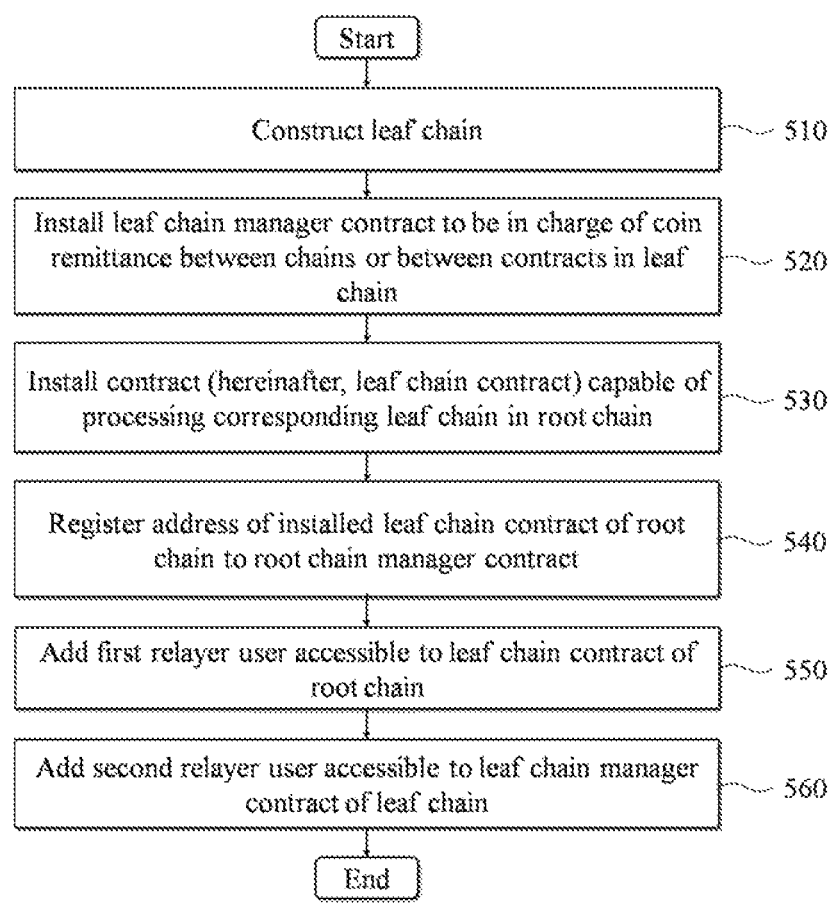
FIG. 5 is a flowchart illustrating an example of a process of adding a new leaf chain according to at least one example embodiment.

FIG. 5 is a flowchart illustrating an example of a process of adding a new leaf chain according to at least one example embodiment.

Referring to FIG. 5, in operation 510, the transaction processing system 300 may construct a leaf chain. For example, a new leaf chain may be constructed to add a new service, which is described below.

In operation 520, the transaction processing system 300 may install a leaf chain manager contract to be in charge of a coin remittance between chains or between contracts in the leaf chain.

In operation 530, the transaction processing system 300 may install a leaf chain contract capable of processing the corresponding leaf chain in a root chain.

In operation 540, the transaction processing system 300 may register an address of the installed leaf chain contract of the root chain to a root chain manager contract.

In operation 550, the transaction processing system 300 may add a first relayer user accessible to the leaf chain contract of the root chain.

In operation 560, the transaction processing system 300 may add a second relayer user accessible to the leaf chain manager contract of the leaf chain.

Here, the first relayer user of operation 550 may be identical to or different from the second relay user of operation 560. In terms of security, it may be advantageous to use a different relayer user for each of leaf chains and the root chain. Here, the relayer user may correspond to an account of a service provided from the transaction processing system 300.

Figure 6:
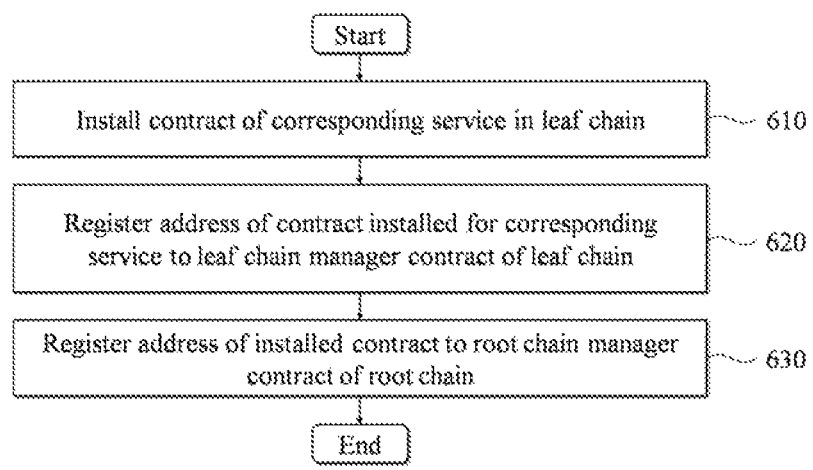
FIG. 6 is a flowchart illustrating an example of a process of adding a new service according to at least one example embodiment.

FIG. 6 is a flowchart illustrating an example of a process of adding a new service according to at least one example embodiment.

Referring to FIG. 6, in operation 610, the transaction processing system 300 may install a contract of a corresponding service in a leaf chain. An address of the installed contract may be used as a value for identifying the corresponding service. The corresponding service may be a contract having a coin exchange protocol between chains.

In operation 620, the transaction processing system 300 may register the address of the contract installed for the corresponding service to a leaf chain manager contract of the leaf chain. For example, as described above, the leaf chain manager contract to be in charge of the coin remittance between chains or between contracts may be installed in the leaf chain as in operation 520 of FIG. 5. The address of the contract for the service may be registered to the leaf chain manager contract.

In operation 630, the transaction processing system 300 may register the address of the installed contract to a root chain manager contract of the root chain. Here, the address of the contract may be registered through an administrator right of the root chain manager contract. When the address of the contract installed for the service of the leaf chain is registered to the root chain manager contract with the leaf chain contract of the corresponding leaf chain installed in the root chain, the address of the contract installed for the service of the leaf chain may be registered as the service of the corresponding leaf chain to the leaf chain contract of the root chain.

Figure 7:
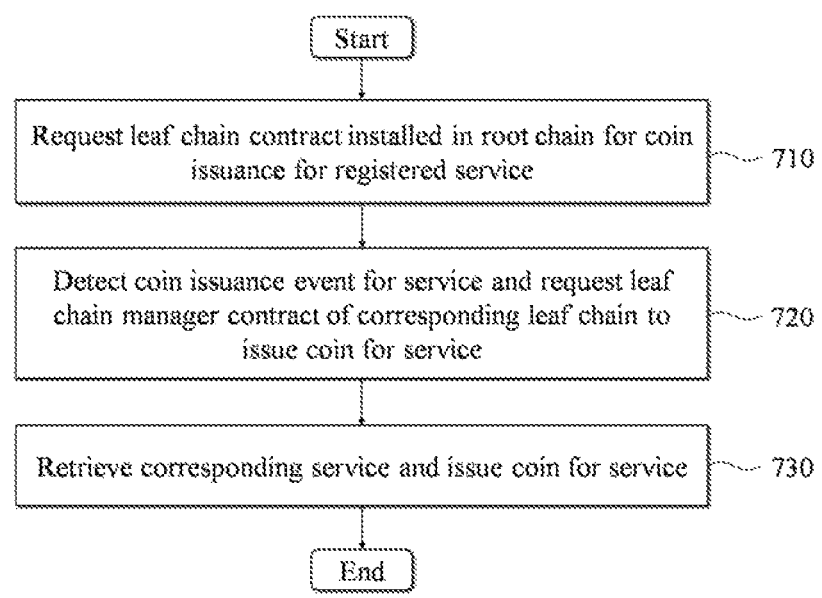
FIG. 7 is a flowchart illustrating an example of a process of issuing a coin for a service according to at least one example embodiment.

FIG. 7 is a flowchart illustrating an example of a process of issuing a coin to a service according to at least one example embodiment.

Referring to FIG. 7, in operation 710, a root chain manager contract of a root chain may request a leaf chain contract installed in the root chain for coin issuance for a registered service. For example, the root chain manager contract of the root chain may identify a service through an address of a contract for the corresponding service for issuing a coin through the leaf chain contract installed in the root chain and may generate a coin issuance event for the identified service.

In operation 720, an interchain consumer may detect the coin issuance event for the service and may request a leaf chain manager contract of a corresponding leaf chain to issue a coin for the service.

In operation 730, the leaf chain manager contract may retrieve the corresponding service and may issue the coin for the service. Here, the coin may be issued to a service operator, for example, the second relayer user added in operation 560 of FIG. 5, which is input when installing the contract of the corresponding service.

Figure 8:
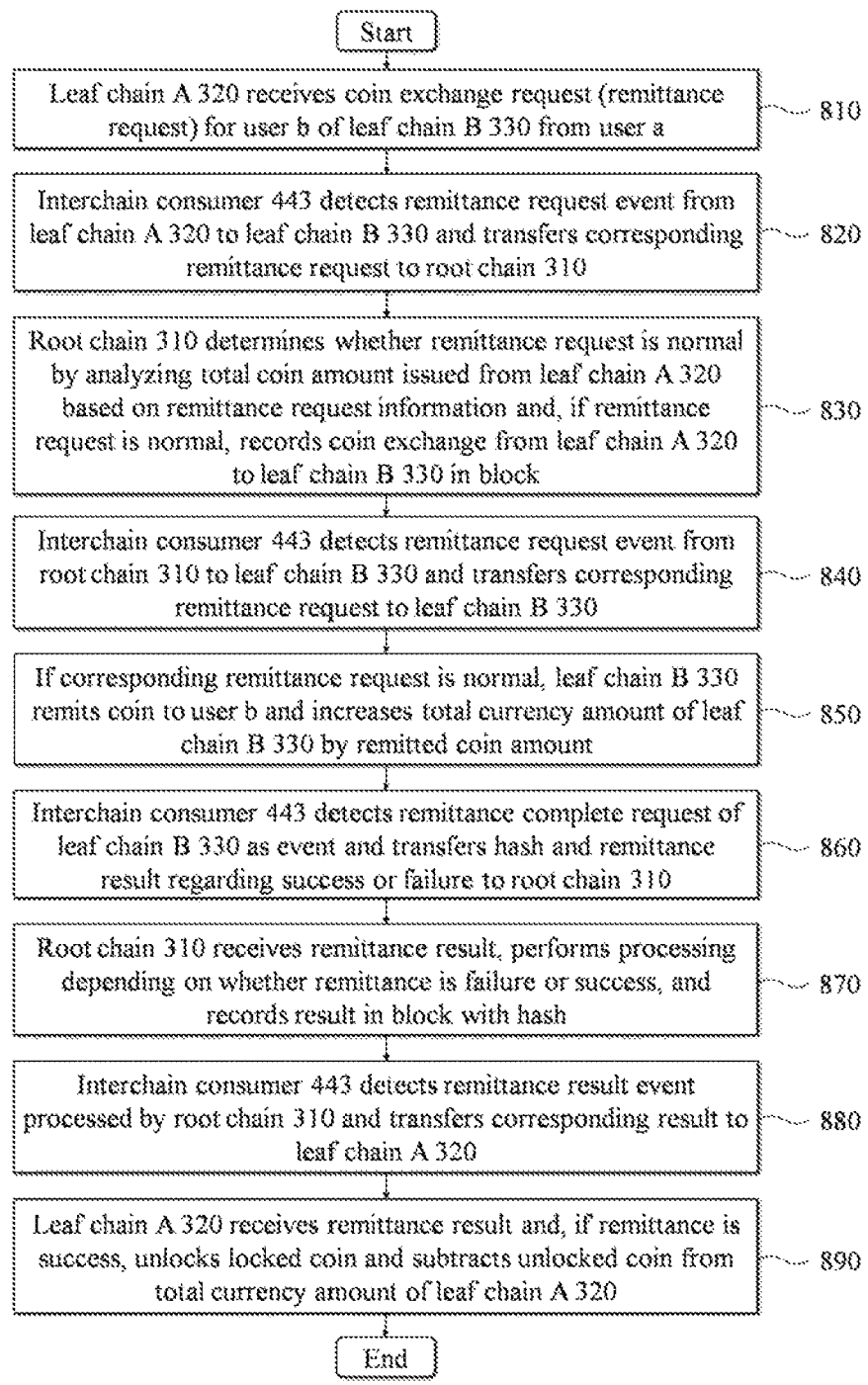
FIG. 8 is a flowchart illustrating an example of a coin exchange process according to at least one example embodiment.

FIG. 8 is a flowchart illustrating an example of a coin exchange process according to at least one example embodiment. A coin exchange in the same service of the same chain may be processed through a smart contract for a coin exchange of a corresponding leaf chain. Also, a coin exchange between different services of the same chain may be processed through a leaf chain manager contract of a corresponding leaf chain. For example, a remittance from a first service to a second service in the same chain may be performed in such a manner that a leaf chain manager contract calls an address of a contract of the second service in response to a remittance request of the first service. A coin exchange between different chains may be processed through operations 810 to 890 of FIG. 9. The following operations 810 to 890 are described based on an example of the coin exchange between the leaf chain A 320 and the leaf chain B 330 described with reference to FIG. 4.

Referring to FIG. 8, in operation 810, the leaf chain A 320 may receive a coin exchange request, for example, a remittance request, for a user b of the leaf chain B 330 from a user a. Here, the leaf chain A 320 may verify balance of the user a and, if the coin exchange request is a normal request, may record the coin exchange request in a block of the leaf chain A 320. For example, the coin exchange request may be determined to be normal when the amount of the coin change request is equal to or less than the balance of the user. Upon receipt of a request for exchange of a coin (i.e., upon receipt of a request for remittance of the coin), the coin may be subtracted from the balance of the user a by a leaf chain manager contract included in the leaf chain A 320 and may be locked to not be used. For example, the leaf chain manager contract of the leaf chain A 320 may lock the balance of the user a and an amount to be subtracted from a currency amount of the leaf chain A 320 requested to be remitted, not to be used by a remittance requested amount. Information on the subtracted amount of the user a may be recorded in an escrow contract. Such a record about a success of the remittance may be recorded in the queue server 442 by the producer 441. If the remittance request is not normal, the leaf chain A 320 may record failure content of the remittance request in a transaction block/node. Also, if the remittance request fails, the leaf chain A 320 may not record the event to prevent an occurrence of the remittance.

In operation 820, the interchain consumer 443 may detect a remittance request event from the leaf chain A 320 to the leaf chain B 330 and may transfer the corresponding remittance request to the root chain 310. The remittance request event may be detected through transaction collection of the producer 441 and the interchain consumer 443 may transfer the remittance request to the root chain 310 in response to the detection of the remittance request event.

In operation 830, the root chain 310 may determine whether the remittance request is normal by analyzing a total coin amount issued from the leaf chain A 320 based on remittance request information and, if the remittance request is normal, may record a coin exchange from the leaf chain A 320 to the leaf chain B 330 in a transaction block/node. A remittance according to the remittance request is processed using exchange of coins issued from the each of the plurality of leaf chains. For example, the coin exchange request may be determined to be normal when the amount of the remittance request is equal to or less than the total coin amount issued from the leaf chain A 320. In response to an exchange request, a coin amount to be remitted may be locked not be used. On the contrary, if the remittance request is not normal, the root chain 310 may record failure content in the block. The remittance request recorded as a failure may be detected as a remittance failure event by the interchain consumer 443 and transferred to the leaf chain A 320. In response to receiving the remittance failure event, the leaf chain A 320 may unlock the locked coin and may return the unlocked coin to the user a.

In operation 840, the interchain consumer 443 may detect a remittance request event from the root chain 310 to the leaf chain B 330 and may transfer a corresponding remittance request to the leaf chain B 330. If invoke fails due to a malfunction of the leaf chain B 330, the leaf chain B 330 may transmit transfer failure content according to a system malfunction of the leaf chain B 330 to the root chain 310. The request recorded as a failure may be detected again as a remittance failure event by the interchain consumer 443 and may be transferred to the leaf chain A 320. In response to receiving the remittance failure event, the leaf chain A 320 may unlock the locked coin and may return the unlocked coin to the user a.

In operation 850, if the corresponding remittance request is normal, the leaf chain B 330 may remit the coin to the user b and may increase a total currency amount of the leaf chain B 330 by the remitted coin amount. On the contrary, if the remittance request fails, the leaf chain B 330 may record remittance failure content in a transaction block/node.

In operation 860, the interchain consumer 443 may detect a remittance complete result of the leaf chain B 330 as an event and may transfer a hash and a remittance result regarding a success or a failure to the root chain 310.

In operation 870, the root chain 310 may receive the remittance result, may perform processing depending on whether the remittance is a failure or a success, and may record the result in the block with the hash. If the remittance is a success, the root chain 310 may unlock the locked coin, may proceed with the remittance from the leaf chain A 320 to the leaf chain B 330, and may change each corresponding currency amount. If the remittance is a failure, the root chain 310 may unlock the locked coin and may return the same to the leaf chain A 320.

In operation 880, the interchain consumer 443 may detect a remittance result event processed by the root chain 310 and may transfer the detected remittance result to the leaf chain A 320.

In operation 890, the leaf chain A 320 may receive the remittance result and, if the remittance is a success, may unlock the locked coin and adjust a total currency amount of the leaf chain A 320, for example, may subtract a remittance amount from a total currency amount. On the contrary, if the remittance is a failure, the leaf chain A 320 may unlock the locked coin and may return the unlocked coin to the user a. The leaf chain A 320 may record the remittance result in the block with the hash recorded in the root chain 310.

Figure 9:
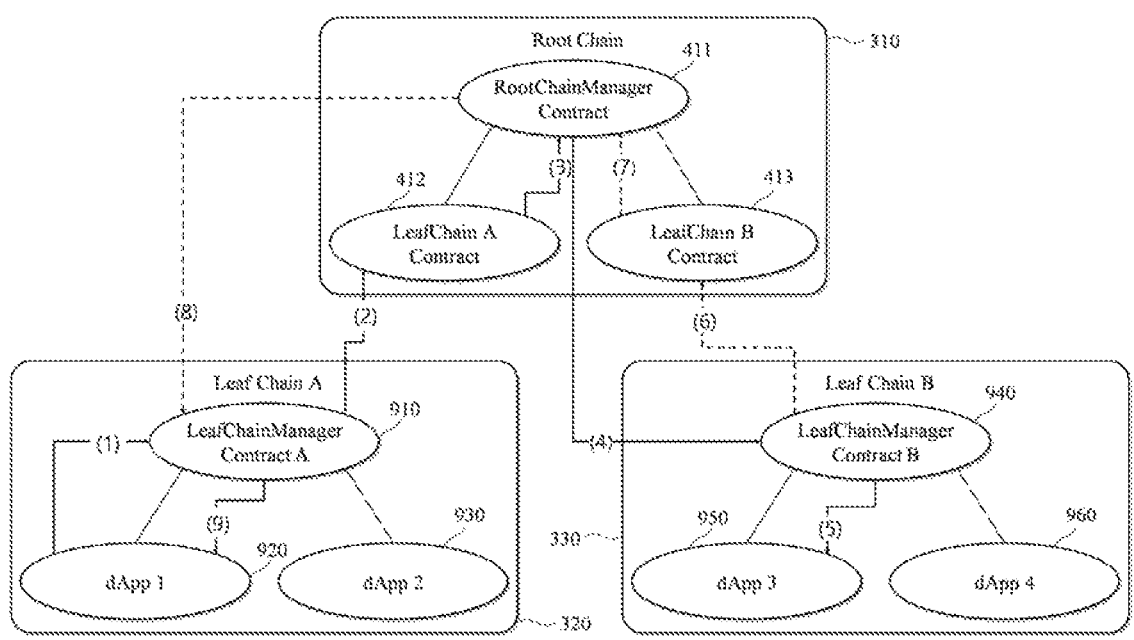
FIG. 9 illustrates an example of a flow of coin exchange data through a smart contract between chains according to at least one example embodiment.

FIG. 9 illustrates an example of a flow of coin exchange data through a smart contract between chains according to at least one example embodiment.

In operation (1), when a coin exchange request from a user a is received by dApp 1 920 of the leaf chain A 320, the dApp 1 920 may request a leaf chain manager contract (LeafChainManager Contract) A 910 for coin exchange. The leaf chain manager contract A 910 may generate an exchange transaction hash (eTxHash) and may record the exchange transaction hash, (an identifier of) a user and (an identifier of) a service that request a remittance, (an identifier of) a service and (an identifier of) a user b that receive the remittance, amount information (remittance amount) and/or a request time, that is, may generate a remittance request record (escrow information). Here, the leaf chain manager contract A 910 may subtract a total currency amount of a contract of the dApp 1 920 and a balance of the user a, that is, an amount held by the user a.

In operation (2), the producer 441 may collect a transaction generated in operation (1), and the interchain consumer 443 may request the leaf chain A contract 412 of the root chain 310 for the remittance.

In operation (3), the leaf chain A contract 412 may separately record remittance request information with respect to the root chain 310 through the root chain manager contract 411. Here, a remittance amount may be subtracted from a total currency amount of the dApp 1 920 managed by the leaf chain manager contract A 910.

In operation (4), the producer 441 may collect a transaction generated in operation (3), and the interchain consumer 443 may request a leaf chain manager contract (LeafChainManager Contract) B 940 of the leaf chain B 330 that has a remittance receiving service In operation (5), the leaf chain manager contract B 940 of the leaf chain B 330 may call dApp 3 950 that is a remittance providing service such that the remittance to the user b may be performed in a contract of the dApp 3 950. Here, the contract of the dApp 3 950 may increase a total currency amount of the leaf chain B 330.

In operation (6), the producer 441 may collect a transaction generated in operation (5), and the interchain consumer 443 may request the leaf chain B contract 413 of the root chain 310 to complete the remittance.

In operation (7), the leaf chain B contract 413 of the root chain 310 may fetch escrow (remittance request record) information of the corresponding remittance request from the root chain manager contract 411 and may process the remittance complete. If the remittance is a success, a total currency amount of the leaf chain B 330 may increase by the remittance amount in the dApp 3 950 managed by the leaf chain B contract 413 and the corresponding remittance request record may be deleted from the root chain manager contract 411 of the root chain 310. If the remittance is a failure, a total currency amount of the leaf chain A 320 may increase again by the remittance amount in the dApp 1 920 that is a remittance request service registered to the leaf chain A contract 412 and the corresponding remittance request record may be deleted from the root chain manager contract 411 of the root chain 310.

In operation (8), the producer 441 may collect a transaction generated in operation (7), and the interchain consumer 443 may request the leaf chain manager contract A 910 of the leaf chain A 320 to complete the remittance.

In operation (9), the leaf chain manager contract A 910 of the leaf chain A 320 may receive remittance complete information, may record that the corresponding exchange transaction hash is completed, and may delete the corresponding request present in the remittance request record (escrow). If the remittance fails, the leaf chain manager contract A 910 may return an amount present in the remittance request record (escrow) to the user a, may increase again a total currency amount of the dApp 1 920 by the remittance amount, and then may delete the corresponding request from the remittance request record (escrow).

Examples of methods of migrating an existing service to the transaction processing system 300 follow as:

1. A method of dividing a generated transaction into a leaf chain having each corresponding service and generating a block;
2. A method of replicating a current link chain and generating the same as each leaf chain;
3. A method of continuously maintaining a currently operating service in a single leaf chain without separation into each leaf chain; and
4. A method of maintaining a user balance of a service to be migrated as is and remitting balances of all of the users to a newly installed leaf chain, in which no more remittance is allowed and only reference is allowed in an existing service.

Depending on example embodiments, a relayer may be present for each chain. For example, as described above with FIG. 4, if a single root chain 310 and two leaf chains 320 and 330 are present, three relayers may be constructed for a total of three chains. In this case, the relayer of the root chain 310 may process transfer of a request, data and/or an event with the two leaf chains 320 and 330. The respective relayers of the two leaf chains 320 and 330 may process transfer of a request, data and/or event with the root chain 310. Here, to prevent rigging of the relayers for the leaf chains, a chain connected to each of the relayers may dynamically vary at preset time intervals, for example, at block time intervals. In the example, in the case of a migration between chains through a hashed timelock contract, an exchange transaction may not be extorted or modulated in the middle by a relayer. Also, a separate exchange transaction identifier may be used as a unique identifier to prevent an unintended double payment of a relayer. The exchange transaction identifier may be used to uniquely identify and track an exchange transaction in response to a value migration between leaf chains.

Figure 10:
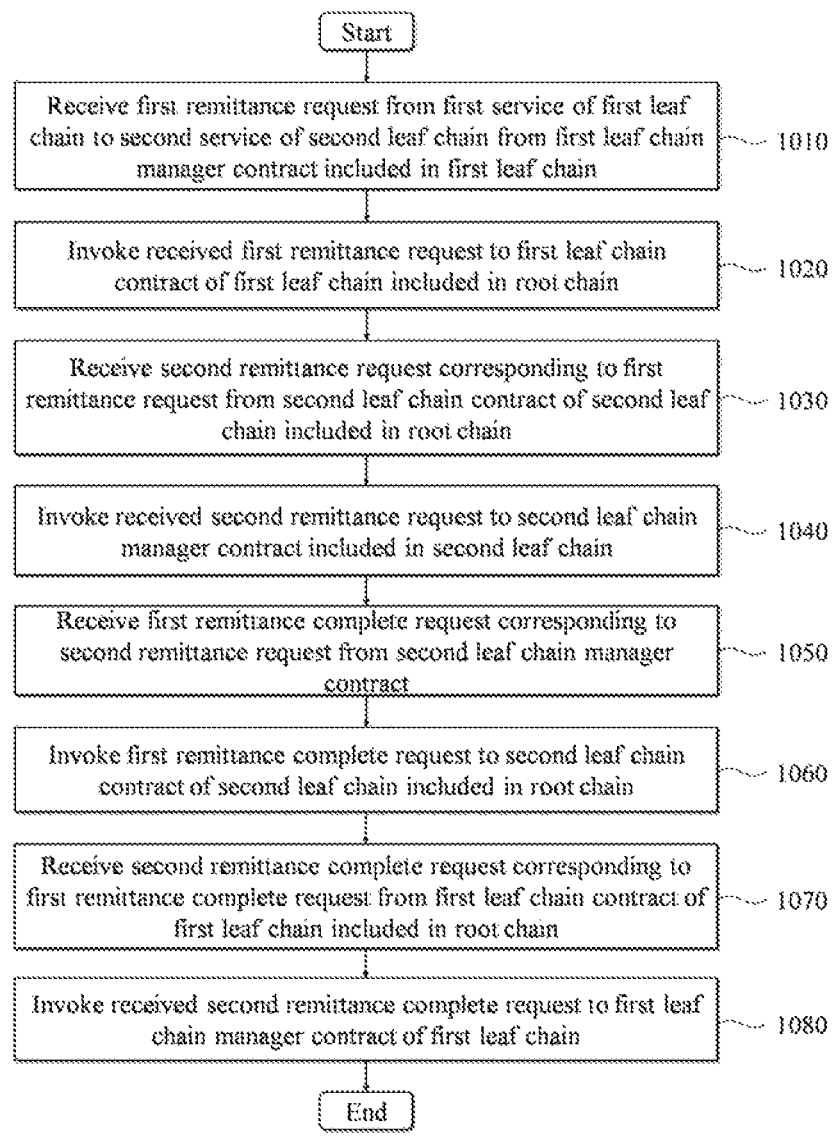
FIG. 10 is a flowchart illustrating an example of a transaction processing method of a relayer according to at least one example embodiment.

FIG. 10 is a flowchart illustrating an example of a transaction processing method of a relayer according to at least one example embodiment. The transaction processing method according to the example embodiment may be performed by the aforementioned computer apparatus 200 that configures the relayer 340. Depending on example embodiments, the relayer 340 may be configured by a plurality of computer apparatuses. For example, each of the aforementioned producer 441, interchain consumer 443, queue server 442, interchain failover 443, and the like, may be configured through an individual computer apparatus and may be configured to communicate with one another over a network. An example in which a single relayer is configured by a single computer apparatus 200 and processes the transaction processing method is described with reference to FIG. 10. For example, the processor 220 of the computer apparatus 200 may be configured to execute a control instruction according to a code of at least one program or a code of an OS included in the memory 210. Here, the processor 220 may control the computer apparatus 200 to perform operations 1010 to 1080 included in the transaction processing method of FIG. 10 in response to the control instruction provided from the code stored in the computer apparatus 200.

Referring to FIG. 10, in operation 1010, the computer apparatus 200 may receive a first remittance request from a first service of a first leaf chain to a second service of a second leaf chain from a first leaf chain manager contract included in the first leaf chain. For example, the first remittance request may include a remittance request from a first user of the first service to a second user of the second service. Here, coin according to the remittance request may be subtracted from balance of the first user through the first leaf chain manager contract included in the first leaf chain and be locked to not be used, and may be stored in an escrow contract as a remittance request record. The operation of receiving a request may include receiving data corresponding to the request and/or referring to an event generated in response to the request. For example, the operation of receiving the first remittance request may include receiving, by the computer apparatus 200, data corresponding to the first remittance request from the first leaf chain manager contract and may also indicate referring, by the computer apparatus 200, to the first leaf chain manager contract about an event generated in response to the first remittance request. The aforementioned description relating to receiving the request may apply alike to the following receiving processes.

In operation 1020, the computer apparatus 200 may cause the received first remittance request to be transmitted to a first leaf chain contract of the first leaf chain included in a root chain. For example, a relayer may receive the first remittance request through transaction collection of a producer and may transfer the first remittance request to the first leaf chain contract of the first leaf chain included in the root chain through an interchain consumer 443.

In operation 1030, the computer apparatus 200 may receive a second remittance request corresponding to the first remittance request from a second leaf chain contract of the second leaf chain included in the root chain. For example, when a root chain manager contract included in the root chain determines whether the first remittance request is normal by analyzing a total coin amount issued from each of a plurality of leaf chains based on remittance request information, records the first remittance request determined to be normal in a block, and transmits the second remittance request corresponding to the first remittance request to the relayer through the second leaf chain contract, the computer apparatus 200 may receive the second remittance request. The first remittance request may be determined to be normal when the amount of the first remittance request is equal to or less than the total coin amount.

In operation 1040, the computer apparatus 200 may cause the received second remittance request to be transmitted to a second leaf chain manager contract included in the second leaf chain. For example, the relayer may receive the second remittance request through transaction collection of the producer and may transfer the second remittance request to the second leaf chain manager contract of the second leaf chain included in the root chain through the interchain consumer 443.

In operation 1050, the computer apparatus 200 may receive a first remittance complete request corresponding to the second remittance request from the second leaf chain manager contract. The first remittance complete request may be generated in response to the second leaf chain manager contract determining that the second remittance request is normal and the relayer may receive the first remittance complete request through transaction collection of the producer. The second remittance request may be determined to be normal when the amount of the second remittance request is equal to or less than the total coin amount.

In operation 1060, the computer apparatus 200 may cause the first remittance complete request to be transmitted to the second leaf chain contract of the second leaf chain included in the root chain. For example, the relayer may transfer the first remittance complete request to the second leaf chain contract of the second leaf chain included in the root chain through the interchain consumer 443.

In operation 1070, the computer apparatus 200 may receive a second remittance complete request corresponding to the first remittance complete request from the first leaf chain contract of the first leaf chain included in the root chain. The second remittance complete request may be generated in response to the root chain manager contract included in the root chain determining that the second remittance complete request is normal. The relayer may receive the second remittance complete request through transaction collection of the producer.

In operation 1080, the computer apparatus 200 may cause the received second remittance complete request to be transmitted to the first leaf chain manager contract of the first leaf chain. For example, the relayer may transfer the second remittance complete request to the first leaf chain manager contract of the first leaf chain through the interchain consumer 443. The first leaf chain manager contract of the first leaf chain may adjust a total currency amount of the first leaf chain in response to the second remittance complete request transferred through the relayer.

According to example embodiments, there may be provided a transaction processing system and method that may scale out by adding a leaf chain based on a root chain.

The systems and/or apparatuses described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A transaction processing system comprising one or more processors to implement:
    a plurality of leaf chains comprising a first leaf chain and a second leaf chain, the first leaf chain and the second leaf chain comprising a first leaf chain manager contract and a second leaf chain manager contract, respectively;
    a root chain comprising a root chain manager contract for the root chain, a first leaf chain contract for the first leaf chain, and a second leaf chain contract for the second leaf chain; and
    at least one relayer located between the root chain and the plurality of leaf chains, and configured to process a remittance request from the first leaf chain to the second leaf chain through relay between the first leaf chain manager contract included in the first leaf chain and the first leaf chain contract included in the root chain and between the second leaf chain contract included in the root chain and a second leaf chain manager contract included in the second leaf chain, wherein the root chain manager contract is configured to determine whether the remittance request is normal by analyzing a total coin amount issued from each of the plurality of leaf chains based on remittance request information, and record the remittance request determined to be normal in a transaction block.

2. The transaction processing system of claim 1, wherein one of the at least one relayer comprises:
- a producer module configured to collect a transaction generated in each of the plurality of leaf chains or an allocated leaf chain, and collect a transaction generated in the root chain; and
- an interchain consumer module configured to transfer a first remittance request from the first leaf chain manager contract in the first leaf chain to a first leaf chain contract in the root chain, or to transfer a second remittance request from the second leaf chain contract in the root chain to the second leaf chain manager contract in the second leaf chain.

3. The transaction processing system of claim 2, wherein the one of the at least one relayer further comprises:
- a queue server configured to store the transaction collected by the producer module in a queue and to sequentially provide the stored transaction to the interchain consumer module; and
- an interchange failover module configured to switch from a first computer system to a second computer system to process the remittance request using the second computer system, in response to a failure of the first computer system being detected while the remittance request is processed by the first computer system.

4. The transaction processing system of claim 1, wherein a remittance according to the remittance request is processed using exchange of coins issued from the each of the plurality of leaf chains.

5. The transaction processing system of claim 4, wherein the root chain manager contract is configured to:
- process a remittance complete request through the relay from each of the plurality of leaf chains using a remittance request record of the remittance request,
- delete the remittance request record when the remittance complete request has been processed, and
- request a corresponding leaf chain to complete a remittance through the at least one relayer.

6. The transaction processing system of claim 1, wherein the root chain manager contract is configured to:
- register an address of a leaf chain contract of a new leaf chain installed in the root chain in response to addition of the new leaf chain, and
- add a relayer user accessible to the first leaf chain contract and the second leaf chain contract in the root chain.

7. The transaction processing system of claim 6, wherein the first leaf chain manager contract is configured to register an address of a service contract for a new service installed in the first leaf chain, and
the root chain manager contract is configured to further register the address of the service contract.

8. The transaction processing system of claim 1, wherein the first leaf chain manager contract is configured to:
- receive a remittance request from a first user through a first service contract installed for a first service of the first leaf chain, record the received remittance request in a transaction block of the first leaf chain, and transfer the received remittance request to the root chain through the at least one relayer, and
- adjust a total currency amount of the first leaf chain in response to a remittance complete request being transferred from the root chain through the at least one relayer.

9. The transaction processing system of claim 8, wherein the first leaf chain manager contract is configured to:
- generate an exchange transaction hash in response to the remittance request, and
- generate a remittance request record including the exchange transaction hash, an identifier of the first service, an identifier of a second service that is a subject of the remittance request, an identifier of a second user of the second service, and a unique value,
- wherein the unique value is generated based on a request time of the remittance request, the identifier of the first leaf chain corresponding to the remittance request, and an identifier of the transaction block.

10. The transaction processing system of claim 8, wherein the first leaf chain manager contract is configured to subtract an amount requested to be remitted from a balance of the first user in response to receiving the remittance request from the first user and to lock the subtracted amount not to be used.

11. The transaction processing system of claim 10, wherein the first leaf chain manager contract is configured to unlock the locked amount and return the amount to the first user in response to a failure of the remittance request.

12. The transaction processing system of claim 10, wherein the at least one relayer comprises relayers respectively corresponding to the plurality of leaf chains and a relayer corresponding to the root chain.

13. The transaction processing system of claim 12, wherein, in the relayers respectively corresponding to the plurality of leaf chains, a corresponding leaf chain dynamically changes at preset time intervals.

14. A transaction processing method of a relayer comprising one or more processors, the transaction processing method comprising:
- receiving, from a first leaf chain manager contract included in a first leaf chain, a first remittance request from a first service of the first leaf chain to a second service of a second leaf chain;
- causing the received first remittance request to be transmitted to a first leaf chain contract of the first leaf chain included in a root chain;
- receiving a second remittance request corresponding to the first remittance request, from a second leaf chain contract of the second leaf chain included in the root chain;
- causing the received second remittance request to be transmitted to a second leaf chain manager contract included in the second leaf chain,
- determining whether the remittance request is normal by analyzing a total coin amount issued from each of the plurality of leaf chains based on remittance request information, and
- recording the remittance request determined to be normal in a transaction block.

15. The transaction processing method of claim 14, further comprising:
- receiving a first remittance complete request corresponding to the second remittance request from the second leaf chain manager contract;
- causing the received first remittance complete request to be transmitted to the second leaf chain manager contract included in the root chain;

receiving a second remittance complete request corresponding to the first remittance complete request from the first leaf chain contract in the root chain; and causing the received second remittance complete request to the first leaf chain manager contract included in the first leaf chain.

16. The transaction processing method of claim 14, wherein the first remittance request comprises a remittance request from a first user of the first service to a second user of the second service, and a coin according to the remittance request is configured to be subtracted from a balance of the first user, to be locked not to be used, and to be stored as a remittance request record in an escrow contract through the first leaf chain manager contract of the first leaf chain.

17. The transaction processing method of claim 14, wherein the receiving of the first remittance request or the receiving of the second remittance request is performed by collecting a transaction through a producer module included in the relayer, and the invoking of the first remittance request or the invoking of the second remittance request is performed through an interchain consumer module further included in the relayer.

18. The transaction processing method of claim 14, wherein a root chain manager contract included in the root chain is configured to transmit the second remittance request corresponding to the first remittance request to the relayer through the second leaf chain contract.

19. A non-transitory computer-readable record medium storing a computer program that when executed by a processor, causes the one or more processors to perform the transaction processing method of claim 14.

20. A relayer for processing a transaction between a first leaf chain and a second leaf chain, with interaction with a root chain, the relayer comprising one or more processors configured to:

receive, from a first leaf chain manager contract module included in the first leaf chain, a first remittance request that requests a remittance from the first leaf chain to the second leaf chain;

cause the received first remittance request to be transmitted to a first leaf chain contract module included in the root chain;

receive a second remittance request corresponding to the first remittance request, from a second leaf chain contract module included in the root chain;

cause the received second remittance request to be transmitted to a second leaf chain manager contract module included in the second leaf chain, determine whether the remittance request is normal by analyzing a total coin amount issued from each of the plurality of leaf chains based on remittance request information, and record the remittance request determined to be normal in a transaction block.

* * * * *